United States Patent
Yasui

(10) Patent No.: US 6,814,370 B2
(45) Date of Patent: Nov. 9, 2004

(54) PASSENGER DETECTION APPARATUS

(75) Inventor: Katsuaki Yasui, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 171 days.

(21) Appl. No.: 09/861,723

(22) Filed: May 22, 2001

(65) Prior Publication Data

US 2002/0070539 A1 Jun. 13, 2002

(30) Foreign Application Priority Data

Dec. 8, 2000 (JP) ................................. P. 2000-373935

(51) Int. Cl.$^7$ ............................................. B60R 21/32
(52) U.S. Cl. ....................... 280/735; 180/271; 180/273
(58) Field of Search ............................... 180/271, 273; 250/231.3

(56) References Cited

U.S. PATENT DOCUMENTS

| | | | | |
|---|---|---|---|---|
| 3,749,866 A | * | 7/1973 | Tiazkun et al. | 200/85 A |
| 3,932,718 A | * | 1/1976 | Porat | 200/61.93 |
| 4,118,691 A | * | 10/1978 | Sims | 222/3 |
| 4,829,287 A | * | 5/1989 | Kerr et al. | 340/541 |
| 4,965,446 A | * | 10/1990 | Vyse | 250/231.14 |
| 4,978,846 A | * | 12/1990 | Buote | 250/231.13 |
| 5,021,648 A | * | 6/1991 | Jones | 250/231.13 |
| 5,164,709 A | * | 11/1992 | Lamberty et al. | 340/667 |
| 5,413,378 A | * | 5/1995 | Steffens et al. | 280/735 |
| 5,573,269 A | * | 11/1996 | Gentry et al. | 280/735 |
| 5,739,757 A | * | 4/1998 | Gioutsos | 340/667 |
| 5,763,874 A | * | 6/1998 | Luciano et al. | 250/231.14 |
| 5,865,463 A | * | 2/1999 | Gagnon et al. | 280/735 |
| 6,053,045 A | * | 4/2000 | Nakamura | 73/514.34 |
| 6,108,842 A | * | 8/2000 | Severinski et al. | 5/653 |
| 6,161,439 A | * | 12/2000 | Stanley | 73/862.391 |
| 6,161,891 A | * | 12/2000 | Blakesley | 296/65.01 |
| 6,169,479 B1 | * | 1/2001 | Boran et al. | 340/436 |
| 6,253,133 B1 | * | 6/2001 | Sakai et al. | 701/45 |
| 6,345,839 B1 | * | 2/2002 | Kuboki et al. | 280/735 |
| 6,348,663 B1 | * | 2/2002 | Schoos et al. | 177/144 |
| 6,356,200 B1 | * | 3/2002 | Hamada et al. | 340/667 |
| 6,556,137 B1 | * | 4/2003 | Oka et al. | 340/561 |

FOREIGN PATENT DOCUMENTS

| | | | | |
|---|---|---|---|---|
| FR | 2571842 | * | 10/1984 | |
| GB | 2160266 | * | 12/1985 | |
| GB | 2160266 A | * | 12/1985 | F02D/17/04 |
| JP | 5-139233 | | 6/1993 | B60R/21/16 |

* cited by examiner

Primary Examiner—Paul N. Dickson
Assistant Examiner—Deanna Draper
(74) Attorney, Agent, or Firm—Sughrue Mion, PLLC

(57) ABSTRACT

A detection apparatus according to the present invention is arranged to input to a displacement detector by force transmission thread and detects the displacement of a power point caused through contact with a person or object.

11 Claims, 3 Drawing Sheets

PASSENGER DETECTION APPARATUS

BACKGROUND OF THE INVENTION

The present invention relates to a passenger detection apparatus for detecting the existence of a passenger in an automobile for use in an airbag system, an antitheft system, etc.

An airbag expands between a passenger and a framework, such as a dashboard, etc., at the time of an automobile collision to protect the passenger. However, the airbag is expensive and the expansion thereof with no passenger involves a heavy economic burden. Hence, a control has been exercised by which an airbag is expanded depending on the existence of a passenger at the time of collision. Also, in case there is an intruder in an automobile, it is necessary to detect this occupancy and take a coping measure.

As a passenger detection apparatus for this purpose, for example, the one described in the Unexamined Japanese Patent Application Publication No. Hei 05-139233 is known. The construction of this apparatus will be explained with reference to FIG. 7. In the figure, the reference numeral 540 depicts a rubber pad spread on an automobile seat, 550 a plurality of piezoelectric film sensors fixed to the pad 540, and 560 a plurality of weight sensors fixed to the pad 540.

Next, the operation will be explained. When a passenger sits on the seat, the piezoelectric film sensors in the portion on the passenger are flexed, then producing electrical pulses. Also, the weight sensors are flexed to cause a change in the resistance thereof. Thus, monitoring the output of the sensors 550 and 560 enables determination of the existence of a passenger and the boarding position of the passenger.

Since the conventional passenger sensor is arranged as above, a passenger cannot be detected unless the passenger is in the position in contact with the sensor. Therefore, there is a problem that, in order to detect the existence of a passenger even in case the passenger boards in a position out of a normal boarding position, a multiplicity of sensors are required to be provided in a wide range, thus resulting in a high cost.

Also, as a method for detecting a wide-ranging pressure by one sensor, as disclosed in the Unexamined Japanese Patent Application Publication No. Hei 10-029495 and No. 2000-062565, etc., there is suggested a method in which a bladder having fluid sealed therein is provided inside a seat and a pressure sensor detects a pressure increase inside the bladder caused by the passenger weight. However, this method has a problem that, since the sensor cannot attain its function when the preload inside the bladder is deflated, a sealing structure for maintaining the preload is required and it is difficult to make this structure durable, still allowing no moderate-price production.

SUMMARY OF THE INVENTION

The invention has been-made to solve the aforesaid problems and an object thereof is to obtain a passenger detection apparatus which can cover a wide range in a simple construction.

The passenger detection apparatus according to the invention includes force transmission thread which is subjected to a tensile force by a power point arranged on a place, such as a seat, a floor surface, a wall surface or the like, which may possibly be displaced through contact with a passenger, a means for tensioning the force transmission thread, and a means for detecting the displacement of the force transmission thread.

DETAILED DESCRIPTION OF THE PREFERRED EMBODIMENTS

First Embodiment

Figure 1:
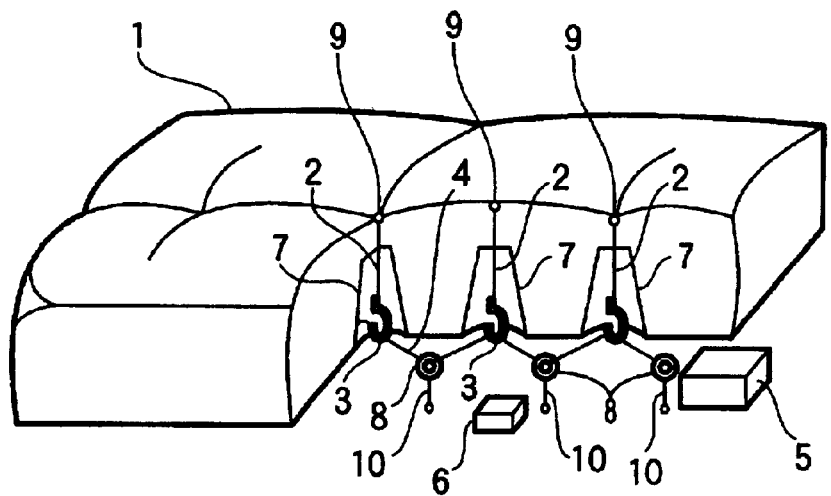
FIG. 1 is a block diagram of the passenger detection apparatus according to the first embodiment of the invention.

FIG. 1 is a block diagram in the case where the passenger detection apparatus according to the first embodiment of the invention is provided in the rear seat of an automobile. In the figure, the reference numeral 6 depicts an acceleration detector, and 1 a rear seat which body is formed of sponge. Cavities 7 are formed at required positions in the sponge in the backside of the seat. A force transmission thread 2, through the cavity 7, is stitched on each power point 9 on the cover cloth on the seat surface at one end, and is attached to each hook 3 at the other end. A force transmission thread 4 is fixed to the far left as seen in the figure of the seat at one end, being stretched in a zigzag as shown in the figure, passing through the hook 3 and a ring 8 fixed to the frame member of the seat via a force transmission thread 10, and the movable end as the other end of the thread is connected to a displacement detector 5. The output signals of the displacement detector 5 and the acceleration detector 6 are coupled to a not-shown ECU 40.

Figure 2:
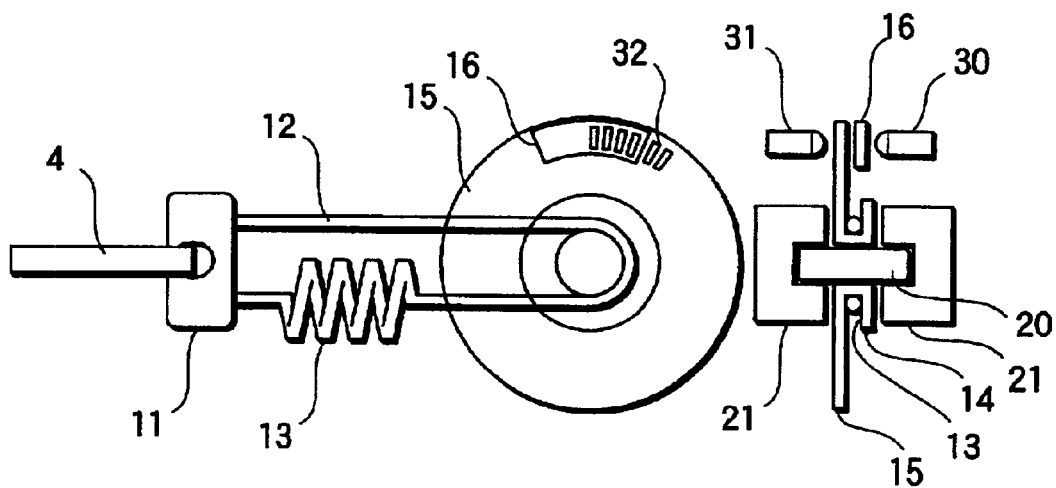
FIG. 2 is a block diagram for explaining the operation of the displacement detector of the passenger detection apparatus according to the first embodiment of the invention.

FIG. 2 is a block diagram showing the details of the displacement detector 5. In the figure, the reference numeral 11 depicts a tension detector having the force transmission thread 4 connected thereto, 12 a belt, 13 a spring, and 14 a pulley having the belt 12 put round. The reference numeral 15 depicts a disc integrated with the pulley 14, having a multiplicity of slits 32 formed radially thereon. The numeral 16 depicts an auxiliary plate having a multiplicity of slits 32 similar to the disc 15, 30 a light emitting element, 31 a light receiving element, 20 a shaft for rotatably supporting the pulley 14, and 21 a bearing.

Next, the operation will be explained. When a passenger sits on the seat 1, the seat 1 is flexed and the force transmission thread 2 stitched on each power point 9 on the cover cloth of the seat top surface comes down. Then, the force transmission thread 4 is pulled in the direction of the displacement detector 5 by the force of the spring 13. At this time, the pulley 14 and the disc 15 are rotated clockwise as seen in the figure. By detecting this rotational motion on the known principle of encoder using the auxiliary plate 16, the light emitting element 30 and the light receiving element 31, it is possible to detect the displacement of the seat and the existence of the passenger who has caused the displacement.

As described above, in case the passenger moves briskly, the force transmission thread 4 is slidingly displaced relative to the hook 3 and the ring 8. On the other hand, in the case of such a slow motion as imparted when the passenger stirs on the seat 1, in some cases, the force transmission thread 4 cannot overcome the friction force against the hook 3 and the ring 8 for sliding displacement. However, only being pulled laterally to the force transmission thread 4 by the force transmission threads 2 and 10 respectively, the hook 3 and the ring 8 can be moved in the warp direction along the force transmission thread 4 to some extent. Hence, it is possible to transmit a very small amount of displacement of the power point to the displacement detecting means without any influence of friction.

Determination of whether what is placed on the seat 1 is a living being or a baggage cannot be made by judging only from the amount of displacement of the seat. Hence, the ECU 40, monitoring the displacement of the seat, determines that there exists a living being, such as a passenger, a pet animal or the like, when there is movement on the seat in case the automobile is under no acceleration during stopping, travel on a flat straight road at a regular speed, or the like.

Even while the automobile is at a stop, there can arise such a case that the seat as well as the automobile body is vibrated due to the vibration by the idling of engine, the vibration generated by a full size car passing by, etc., causing the displacement detector 5 to detect the movement. Accordingly, with reference to the output signal of the acceleration detector 6, the ECU 40 distinguishes these vibrations from the movement made by the passenger so as to prevent the false passenger detection resulting from the vibration generated by any other cause than the passenger.

The force transmission thread 4 is adjusted to such length as to be tensioned all the time by the spring 13 regardless of the sitting condition of the passenger. When the force transmission thread 4 is snapped or slackened due to fatigue, the displacement detector 5 is not operated normally. Hence, monitoring the tension through the tension detector 11, with no tension detected, the ECU 40 generates the signal of self-diagnostic result showing the abnormality of the passenger detection apparatus.

Second Embodiment

Figure 3:
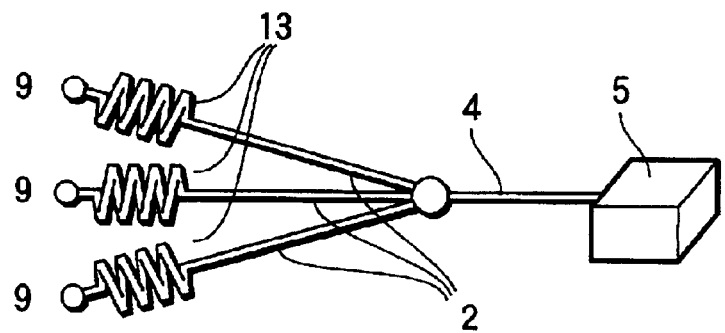
FIG. 3 is a block diagram showing the connection of the force transmission thread of the passenger detection apparatus.

In the aforesaid first embodiment, since being connected in a manner that the displacement of each force transmission thread 2 connected to the corresponding power point 9 on the seat surface exerts a substantially independent influence upon the movement of the movable end of the force transmission thread 4, the displacement detector 5 is arranged to detect the sum total of displacement of the respective power points. However, in case there is a configurational problem, as shown in FIG. 3, a spring 13 maybe provided at each force transmission thread 2 connected to the corresponding power point 9, so that the displacement of the respective power points 9 is input to the displacement detector 5 in parallel, so as to operate in the same manner.

Third Embodiment

Figure 4:
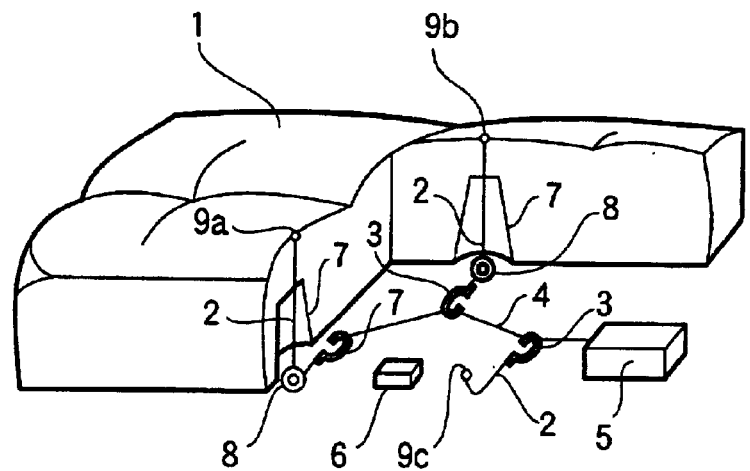
FIG. 4 is a block diagram of the passenger detection apparatus according to the third embodiment of the invention.

As shown by 9a and 9b in FIG. 4, the power points 9 may be arranged in a zigzag manner on the seat surface. Thereby, it becomes possible to detect in a still wider range the existence of the passenger who has sat outside a fixed position. Also, a power point as shown by 9c in the figure may be arranged at a lower portion of the cover cloth on the front end of the seat. Thereby, it becomes possible to detect even a child, sleeping on the floor between the rear and front seats, in contact only with the front end of the rear seat.

Fourth Embodiment

Figure 5:
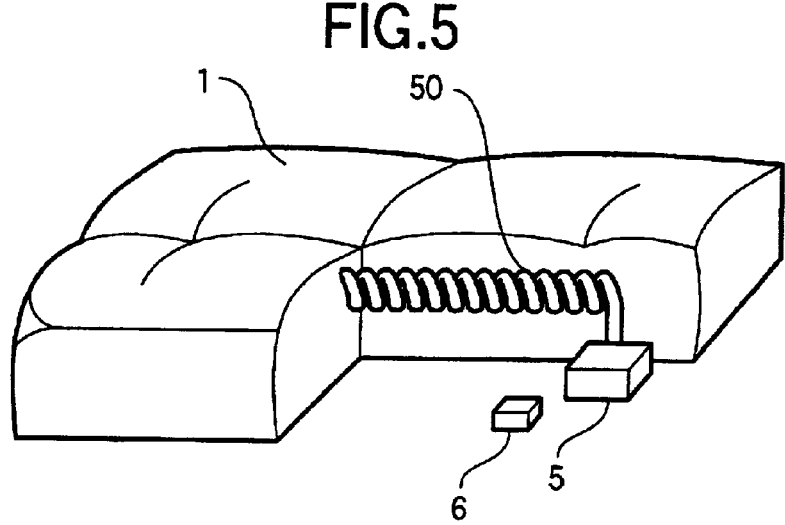
FIG. 5 is a block diagram of the passenger detection apparatus according to the fourth embodiment of the invention.
Figure 6:
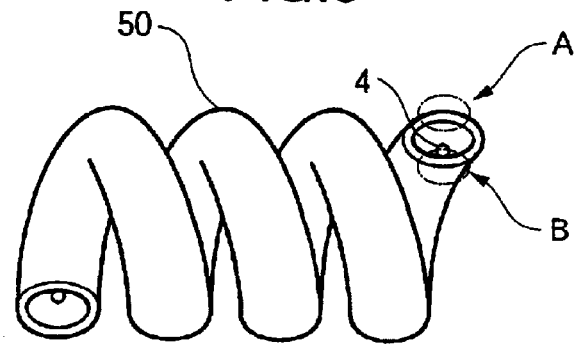
FIG. 6 is a partially sectional view showing the construction of the passenger detection apparatus tube according to the fourth embodiment of the invention.
Figure 7:
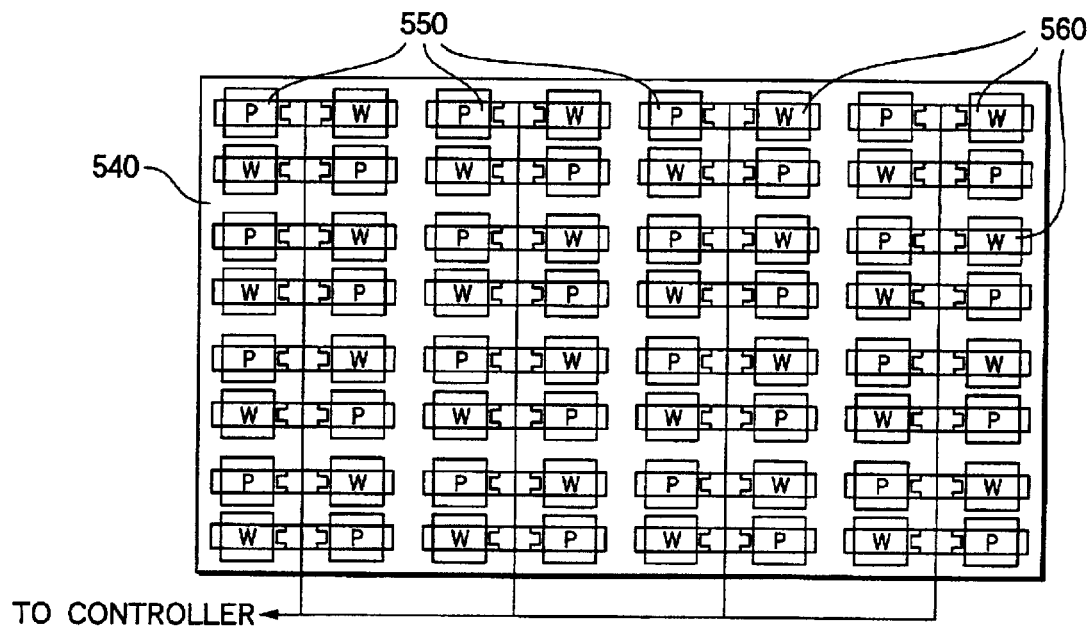
FIG. 7 is a block diagram showing a conventional passenger detection apparatus.

In the aforesaid first and second embodiments, the force transmission thread is connected directly to the power point on the seat surface. Alternatively, the force transmission thread may be provided in a tube in a manner that the force transmission thread is connected to a power point through the tube, i.e., so as to detect a passenger indirectly by the deformation of the tube. FIG. 5 is a block diagram in the case where the passenger detection apparatus according to the fourth embodiment of the invention is provided in the rear seat. In the figure, the reference numeral 50 depicts a tube embedded in the sponge of the seat body. FIG. 6 is a sectional view showing the inside thereof.

As shown in the figure, the tube 50 is curled. The force transmission thread 4 is inserted into the inside of the tube and tensioned by the spring 13 in the displacement detector 5. Accordingly, the force transmission thread 4 is tensioned along the wall face at a position shown by B in the figure on the inner side of the curl, so as to take the shortest course in the tube.

As compared the length of the wall face along the position B on the inner side of the curl and the length of the wall face along a position shown by A in the figure on the outer side of the curl, it is obvious that the latter is longer. However, the passenger sits on the seat 1 and the tube 50 is squeezed in the vertical direction by the flexure of the seat 1, causing the positions A and B to approach each other. Hence, the difference in length between the wall faces along the two positions becomes small, and the wall face along the position A is contracted in length while the wall face along the position B is extended in length. Thus, the movable end of the force transmission thread 4 along the position B is displaced in such a direction as to be pulled out of the displacement detector 5. Accordingly, it is possible to detect the existence of the passenger in the same manner as in the aforesaid first embodiment.

In the fourth embodiment, since the force transmission thread 4 is housed in the tube, there is an advantage to facilitate handling and assembling work.

Also, in the aforesaid respective embodiments, as a means for tensioning the force transmission thread, a coiled spring is provided in the displacement detector 5. Alternatively, an elastic member, such as a spiral spring, rubber or the like, may be used therein so as to operate in the same manner.

Further, in the aforesaid embodiment, a hook and a ring are used for leading the force transmission thread. Alternatively, a pulley may be used, and thereby the influence of frictional resistance can be lessened so that the detecting sensitivity can be further enhanced.

Furthermore, in the aforesaid embodiment, the displacement detector 5 is fixed to a fixed object to detect the movement of the power point connected to the force transmission thread. Alternatively, for example, in order to detect a child, or the like, shut in a trunk, the displacement detector 5 may be fixed to a trunk bottom plate, or the like, to be flexed by the existence of the child. Also, the leading end of the force transmission thread may be fixed to a fixed object, such as a chassis or the like. That is, the essential point of the invention is to detect the displacement of the power point by the displacement of the force transmission thread, and thus the displacement detector may be provided on either the fixed side or the displaced side (power point side). In the case of the seat, the passenger applies pressure to one point on the seat only to move the point and its immediate vicinity, so that a multiplicity of power points need to be provided. On the other hand, in the case of a bottom plate, a child steps thereon and the whole bottom plate is deformed, so that the whole trunk can be monitored only by observing the displacement of one or two points.

As described above, according to the invention, the apparatus is arranged to input to a displacement detector by force transmission thread and detect the displacement of automobile members caused through contact with a passenger. Accordingly, there is an advantage that it is possible to obtain a passenger detection apparatus which can detect the passenger in a wide range in a simple construction.

What is claimed is:

1. A passenger detection apparatus comprising:
   force transmission thread connected to a power point of a vehicle which is displaced through contact with a passenger,
   means for tensioning said force transmission thread, and
   means for detecting displacement of said force transmission thread.

2. The passenger detection apparatus according to claim 1, wherein said force transmission thread includes:
   a first force transmission thread connected to any member of the vehicle at one end and to said means for detecting displacement at an other end, and
   a second force transmission thread connected so as to transmit said displacement of said power point from a direction lateral to said first force transmission thread.

3. The passenger detection apparatus according to claim 1, wherein
   said force transmission thread includes a plurality of force transmission threads connected respectively to a plurality of power points via a plurality of elastic members such as tensioning means, springs, coiled springs, spiral springs or an elastomer, which input the displacement in parallel to said displacement detecting means.

4. The passenger detection apparatus according to claim 1, wherein said means for detecting displacement includes means for detecting rotation of a pulley to which said force transmission thread is connected.

5. The passenger detection apparatus according to claim 1, said apparatus further comprising:
   tension detector means for detecting tension of said force transmission thread.

6. The passenger detection apparatus according to claim 1, said apparatus further comprising:
   vibration detecting means for distinguishing vibrations caused by a passenger and vibrations not made by the passenger.

7. A detection apparatus comprising:
   force transmission thread connected to a power point of a vehicle displaced through contact with a person or object;
   a tension mechanism that provides tension to said force transmission thread; and
   a displacement detector connected to said force transmission thread, comprising:
      a disc integrated with a pulley having a multiplicity of slits formed radially thereon.

8. The detection apparatus according to claim 7, said displacement detector further comprising:
   an auxiliary plate having a multiplicity of slits similar to said disc;
   a light emitting element and a light receiving element;
   a shaft that rotatably supports said pulley; and
   a bearing,
   wherein said pulley and said disc rotate in accordance with the displacement of said force transmission thread.

9. A detection system comprising:
   at least one force transmission thread connected to a power point of a vehicle arranged on a seat, a floor surface or a wall surface, that is displaced through contact with a person or object;
   a tensioning device for tensioning the force transmission thread;
   a displacement detector comprising:
      a tension detector having the force transmission thread connected thereto;
      a disc integrated with a pulley having a multiplicity of slits formed radially thereon; and
      a light emitting element and a light receiving element disposed adjacent to an auxiliary plate and said disc,
   wherein the force transmission thread transmits a displacement to the displacement detector causing the pulley to rotate whereby the rotational motion is encoded using said light emitting element, said light receiving element and said auxiliary plate.

10. A passenger detection apparatus comprising:
    force transmission thread connected to a power point which is displaced through contact with a passenger,
    means for tensioning said force transmission thread, and
    means for detecting displacement of said force transmission thread,
    wherein said force transmission thread includes,
       a first force transmission thread connected to any member of an automobile at one end and to the means for detecting displacement at an other end, and
       a second force transmission thread connected so as to transmit said displacement of said power point from a direction lateral to said first force transmission thread.

11. A passenger detection apparatus comprising:
    force transmission thread connected to a power point which is displaced through contact with a passenger,
    means for tensioning said force transmission thread,
    means for detecting displacement of said farce transmission thread, and
    vibration detecting means for distinguishing vibrations caused by a passenger and vibrations not made by the passenger.

* * * * *